United States Patent Office 3,291,683
Patented Dec. 13, 1966

3,291,683
CONTROLLING FUNGI AND BACTERIA WITH ALKOXY OR ALKYLTHIO ALKYLAMINE ETHERS
Glentworth Lamb, Trenton, N.J., assignor to American Cyanamid Company, Stamford, Conn., a corporation of Maine
No Drawing. Filed May 24, 1965, Ser. No. 458,366
10 Claims. (Cl. 167—22)

This application is a continuation-in-part of an application for Letters Patent, Serial No. 381,520 filed July 9, 1964, now abandoned.

The present invention relates to an improved method for controlling fungi and bacteria utilizing a novel class of alkoxy substituted- or alkylthio substituted-alkylamines. More particularly, the invention relates to methods for protecting agricultural, organic and related articles from attack from microorganisms employing certain alkoxy substituted- or alkylthio substituted-alkylamine compounds and their acid addition salts.

Many types of fungicides are presently available. However, most require large dosages for adequate protection. Although they are effective when so applied, they frequently result in severe host toxicity or even death to the host. Fungicides which can be applied at a low rate are highly desirable and are the object of expenditures of time and treasure.

It is, therefore, a principal object of the invention to provide a fungicidal and bactericidal compound of substantially reduced host toxicity. It is a further object to provide a fungicidal and bactericidal compound which, when applied at relatively low dosage rates, is highly effective in its ability to inhibit both fungal and bacterial growth. Other objects and advantages will become apparent from a consideration of the following detailed description.

It has been unexpectedly found that certain alkoxyalkylamines or alkylthioalkylamines as well as their acid addition salts possess unusual fungicidal and bactericidal properties. Surprisingly, the ether or thioether amine derivatives which fall within the purview of the present invention possess these unusual properties, notwithstanding the fact that ether or thioether compounds, in general, are fungicidally or bactericidally inactive.

The ether or thioether amines as well as their acid addition salts employed in the present invention are represented by the formula:

$$R-X-R_1-NH_2$$

wherein R is an alkyl substituent containing from 6 to 18 carbon atoms and mixtures thereof, X is either oxygen or sulfur and $R_1$ is an alkyl substituent containing from 2 to 4 carbon atoms. Illustrative derivatives of ether amines or thioether amines are: hexyloxyethylamine, heptyloxyethylamine, heptylthioethylamine, octyloxypropylamine, dioctyloxypropylamine, lauryloxypropylamine, myristyloxypropylamine, stearyloxypropylamine, heptoxybutylamine, laurylthiopropylamine, octylthioethylamine, nonylthiopropylamine, as well as the hydrochloride, acetate or benzoate salt of each of the aforementioned amines.

Advantageously, the amine derivatives can be readily synthesized. Methods for their preparation are known in the art. For instance, either an alcohol, such as heptanol, or an alkylmercaptan, such as octylmercaptan, can be reacted in substantially equimolar amounts with a nitrile, such as acrylonitrile, to form the corresponding heptoxypropionitrile or octylthiopropionitrile which can thereafter be reduced by catalytic reduction or by chemical reduction with, for instance, lithium aluminum hydride, to form either heptoxypropylamine or octylthiopropylamine.

It is a preferred practice of the invention to incorporate the active ether amine derivative hereinabove defined in a variety of suitable carriers or diluents. In general, the active compounds may be applied in dusts or sprays. For instance, dusts are readily prepared by admixing from 5% to 25% by weight of the active compound with an inert powder carrier, such as attaclay, pumice, kaolin, fuller's earth or talc. Sprays can be made up as emulsifiable concentrates or wettable powders which are dispersed in water prior to application. Emulsifiable concentrates are prepared by dissolving the active material in an organic solvent, such as lower alcohols exemplified by isopropanol or butanol and ketones, such as methylethyl ketone and, thereafter, adding to the latter mixture a small amount, usually within the range of 2% to 5% based on the weight of the mixture, of emulsifying or dispersing agents which are commercially available. These include, for instance, the salts of alkylaryl sulfonic acids, the fatty acid esters of polyhydric alcohols, the sodium salt of polymerized propyl naphthalene sulfonic acid and equivalents thereof.

Advantageously, it has been found that control of fungi which attack living trees, plants and shrubs is accomplished in a straightforward manner by treating the latter with an aqueous wettable powder spray containing from about 0.25 pound to about 2.5 pounds of active ingredient per 100 gallons of water. The wettable powder is prepared by admixing from 50 to 90 parts of active material with from 5 to 35 parts of an inert powder carrier and from 2 to 5 parts of a dispersing agent to which can be added 2 to 5 parts of a silicone antifoaming additive readily available commercially. Although it is to be understood that no particular theory for obtaining the high degree of effectiveness of the wettable powder composition as set forth herein is to be controlling, it is believed that the principal reason for the noted high degree of effectiveness of the wettable powder composition is attributable to the ability of the active ingredient in the composition to redistribute to new plant growth.

To further illustrate the invention, the following examples are presented and are to be taken as illustrative and not by way of limitation. All the parts are by weight unless otherwise noted.

EXAMPLE 1

Fungicidal activity

Agar plates are prepared by measuring twenty milliliters of sterile mineral salts agar into sterile petri dishes and admixing therewith a sufficient quantity of solution containing test compound to provide 50, 100 and 250 parts per million of compound in the mixture. The mixtures are permitted to solidify and then inoculated at six separate locations on the surface with one drop of each inoculum prepared by suspending spores and mycelium from cultures of *Aspergillus niger, Fusarium moniliforme, Penicillium citrinum, Pullularia pullulans, Pythium debaryanum* and *Rhizoctonia solani* in sterile deionized water. After inoculation the plates are covered and incubated at 23° C. for 72 hours. Following incubation, results are observed and recorded as the least concentration in parts per million to inhibit growth. These data with the compounds of the instant invention are provided in Table I below.

TABLE I.—FUNGI INHIBITION TESTS

| Compound | Least Concentration to Inhibit | | | | | |
|---|---|---|---|---|---|---|
| | A. niger | F. moniliforme | P. citrinum | P. pulluans | Py. debaryanum | R. solani |
| n-$C_8H_{17}$—O—$(CH_2)_3NH_2$ | 100 | 100 | >250 | 100 | 100 | 100 |
| n-$C_{10}H_{21}$—O—$(CH_2)_3NH_2$ | >250 | 100 | 50 | 50 | 50 | >250 |
| Mixture A[a] | >250 | 50 | 50 | 50 | 50 | 100 |
| Mixture B[b] | >250 | 100 | 100 | 100 | 100 | >250 |
| Mixture C[c] | 100 | 100 | 100 | 100 | 100 | >250 |

[a] Mixture A has a total amine content of 91.0%, an iodine value of 2.0, and the following analysis of carbon chain lengths in the mixture (R—O—$(CH_2)_3NH_2$):

"R" chain length: Percent
$C_{14}$ ------ 5
$C_{16}$ ------ 30
$C_{18}$ ------ 65

[b] Mixture B has a total amine content of 91.0%, an iodine value of 1.0% and the following analysis of carbon chain length in the mixture (R—O—$(CH_2)_3NH_2$):

"R" chain length: Percent
$C_6$ ------ 5
$C_8$ ------ 60
$C_{10}$ ------ 33
$C_{12}$ ------ 2

[c] Mixture C has a primary amine value of 272.1, secondary amine value of 2.1, and a teritary amine value of 0.3. It contains approximately 55% $C_{11}$ and 45% $C_{13}$ (total carbon atoms in chain).

EXAMPLE 2

The antibacterial activity of the compounds of the subject invention is determined by the following procedure wherein 1.0% peptone and 0.10% dextrose broth is placed in tubes, the tubes are capped and then autoclaved for 10 minutes. Two drops of a bacterial suspension from a 24-hour-old broth culture of *Aerobacter aerogenes, Bacillus cereus f. mycoides, Escherichia coli, Pseudomonas aeruginosa, Staphylococcus aureus* or *Xanthomonas vesicatoria* is added to the appropriate tube along with a solution of test compound in sufficient quantity to provide 10 or 25 parts per million of compound in the mixture in the nutrient broth. The tubes are incubated at 37° C. for 24 hours and then examined for bacterial growth. Results appear in Table II below. The data are recorded as the least concentration to inhibit growth.

TABLE II.—BROTH CULTURE BACTERIA

| Compound | Least Concentration to Inhibit | | | | | |
|---|---|---|---|---|---|---|
| | A. aerogenes | B. mycoides | E. coli | Ps. aeruginosa | Staph. aureus | X. vesicatoria |
| n-$C_8H_{17}$—O—$(CH_2)_3NH_2$ | >25 | >25 | >25 | >25 | >25 | >25 |
| n-$C_{10}H_{21}$—O—$(CH_2)_3NH_2$ | 10 | 25 | >25 | >25 | >25 | 25 |
| Mixture A[a] | >25 | 10 | >25 | 25 | >25 | 25 |
| Mixture B[b] | >25 | >25 | >25 | 25 | >25 | 25 |
| Mixture C[c] | 25 | 25 | 25 | >25 | >25 | >25 |
| Mixture D[d] | >25 | >25 | 25 | >25 | 25 | 25 |

[a],[b],[c] Mixtures A, B, and C are the same as defined in Table I above.
[d] Mixture D is defined as having a total amine content of 91.0%, an iodine value of 4.0, and the following analysis of carbon chain lengths in the mixture )R—O—$(CH_2)_3NH_2$):

"R" chain length: Percent
$C_8$ ------ 8
$C_{10}$ ------ 7
$C_{12}$ ------ 48
$C_{14}$ ------ 18
$C_{16}$ ------ 9
$C_{18}$ ------ 10

EXAMPLE 3

To determine the efficacy of the compounds of the invention against the disease organism, *Venturia inaequalis*, responsible for apple scab, apple seedlings are thoroughly sprayed with aqueous or aqueous-acetone solutions containing ¼, ½, or 1 pound of test compound per 100 gallons of solution. After spraying, the seedlings are permitted to dry and then are inoculated with *V. inaequalis*. The inoculum is prepared in tap water and contains approximately 100,000 conidia per ml. obtained from freshly sporulating lesions. Inoculation of the treated seedlings is accomplished by atomizing the inoculum uniformly onto the foliage. Following inoculation, the seedlings are placed in humidity cabinets maintained at about 70° F. and 100% R.H. for 4 days. Plants then are removed to the greenhouse. On termination of the incubation period of approximately 14 days, the seedlings are examined for lesions. Results of the instant tests are recorded in Table III below.

TABLE III.—APPLE SCAB

| Compound | Number of lesions (3 tree reps.) | | |
|---|---|---|---|
| | At Rates of— | | |
| | 1 lb./100 gal. | ½ lb./100 gal. | ¼ lb./100 gal. |
| n-$C_8H_{17}$—O—$(CH_2)_3NH_2$ | 0 | 0 | 0 |
| n-$C_{10}H_{21}$—O—$(CH_2)_3NH_2$ | 0 | 0 | 0 |
| n-$C_{12}H_{25}$—S—$(CH_2)_3NH_2$·HCl | 0 | 0 | |
| n-$C_{10}H_{21}$—O—$(CH_2)_3NH_2$·HCl | 0 | 0 | |
| n-$C_8H_{17}$—O—$(CH_2)_3NH_2$·$CH_3COOH$ | 0 | 0 | |

EXAMPLE 4

To determine the effectiveness of the compounds of the instant invention for controlling *Colletotrichum lagenarium* and *Phytophthora infestans*, the causative agents for cucumber anthracnose and tomato late blight, respectively, cucumber seedlings with two leaves expanded and tomato seedlings that are 5 inches to 6 inches tall are sprayed to run-off with solutions or suspensions containing graded levels of test compound.

After the spray deposits dry, the plants are uniformly inoculated with the selected pathogen. The inoculated plants are then placed in a controlled temperature and humidity cabinet at 12° F. and 100% relative humidity for 48 hours. Following incubation, the plants are examined for disease symptoms. Representative data are recorded in Table IV below.

TABLE IV

| Compound | Rate, p.p.m. | Disease Control | |
|---|---|---|---|
| | | Cucumber Anthracnose | Tomato Late Blight |
| 3-(dodecylthio)propylamine hydrochloride [n-$C_{12}H_{25}$—S—$(CH_2)_3NH_2 \cdot HCl$] | 100 | Complete control | Trace of disease. |
| 4-(octyloxy)butylamine hydrochloride [n-$C_8H_{17}$—O—$(CH_2)_4NH_2 \cdot HCl$] | 500; 100 | do | No test. |
| 2-(decyloxy)ethylamine hydrochloride [n-$C_{10}H_{21}$—O—$(CH_2)_2NH_2 \cdot HCl$] | 100 | do | Complete control. |
| 3-(octyloxy)propylamine acetate [n-$C_8H_{17}$—O—$(CH_2)_3NH_2 \cdot CH_3COOH$] | 100 | do | Do. |

What is claimed is:

1. A method for controlling fungi and bacteria in an area and on organic products subject to infestation and attack therefrom, comprising: applying to the area to be protected from fungal and bacterial attack, a fungicidal-bactericidal effective amount of a compound selected from the group consisting of an amine having the formula:

$$R—X—R_1—NH_2$$

and the acid addition salt thereof, wherein R is an aliphatic hydrocarbon of from 6 to 18 carbon atoms, X is selected from the group consisting of sulfur and oxygen, and $R_1$ is a lower alkyl radical of from 2 to 4 carbon atoms.

2. A method for protecting ornamental and fruit trees, plants, and shrubs from attack by fungus organisms comprising: applying to said trees, plants, and shrubs a fungicidal effective amount of the compound of claim 1.

3. A process according to claim 1 in which the compound is: octyloxypropylamine.

4. A process according to claim 1 in which the compound is: decyloxypropylamine.

5. A process according to claim 1 in which the effective compound is: lauryloxypropylamine.

6. A process according to claim 1 in which the compound is: myristyloxyethylamine.

7. A process according to claim 1 in which the compound is: lauryloxyethylamine.

8. A process according to claim 1 in which the compound is: octyloxypropylamine acetate.

9. A process according to claim 1 in which the compound is: decyloxyethylamine hydrochloride.

10. A process according to claim 1 in which the compound is: dodecylthiopropylamine hydrochloride.

No references cited.

LEWIS GOTTS, *Primary Examiner.*

S. K. ROSE, *Assistant Examiner.*